(12) United States Patent
Olds (10) Patent No.: US 7,261,119 B2
(45) Date of Patent: Aug. 28, 2007

(54) PRESSURE REGULATOR WITH IMPROVED OUTLET PRESSURE CONTROL

(75) Inventor: Charles M. Olds, Martindale, TX (US)

(73) Assignee: S.H. Leggitt Company, San Marcos, TX (US)

( * ) Notice: Subject to any disclaimer, the term of this patent is extended or adjusted under 35 U.S.C. 154(b) by 241 days.

(21) Appl. No.: 11/048,532

(22) Filed: Feb. 1, 2005

(65) Prior Publication Data

US 2005/0166969 A1   Aug. 4, 2005

Related U.S. Application Data

(60) Provisional application No. 60/541,594, filed on Feb. 4, 2004.

(51) Int. Cl.
*G05D 16/06* (2006.01)
(52) U.S. Cl. .................. 137/14; 137/505; 137/505.46
(58) Field of Classification Search ............. 137/505, 137/505.46, 505.47, 495, 11, 14
See application file for complete search history.

(56) References Cited

U.S. PATENT DOCUMENTS

| | | | |
|---|---|---|---|
| 1,250,104 A | | 12/1917 | Gustafson |
| 1,839,980 A | | 1/1932 | Luchs et al. |
| 1,950,120 A | * | 3/1934 | McKee .................. 137/505.36 |
| 2,023,361 A | | 12/1935 | Tigges |
| 2,593,103 A | | 4/1952 | Casler |
| 2,701,578 A | * | 2/1955 | Hamilton ............... 137/505.46 |
| 2,867,234 A | | 1/1959 | Billington |
| 3,056,424 A | | 10/1962 | Courtol et al. |
| 3,072,143 A | | 1/1963 | Fleischhacker |
| 3,210,056 A | | 10/1965 | Van't Sant |
| 3,386,465 A | | 6/1968 | Johnson |
| 3,387,622 A | * | 6/1968 | Weinstein .................. 137/495 |

(Continued)

FOREIGN PATENT DOCUMENTS

DE    1750130    4/1968

(Continued)

OTHER PUBLICATIONS

Fisher Controls International, Inc., Regulator Type 627, Bulletin 71.1:627, p. 4, date unknown.

(Continued)

*Primary Examiner*—Stephen M. Hepperle
(74) *Attorney, Agent, or Firm*—Price, Heneveld, Cooper, DeWitt & Litton, LLP (57) ABSTRACT

A pressure regulator comprising a housing, a pivoting lever selectively covering a passage between an inlet port and an outlet port of the housing, a diaphragm interconnected to the lever to rotate the lever in reaction to pressure levels in the housing, and a closure member abutting the pivoting lever and covering the passage to prevent fluid flow through the passage. The pressure regulator can have the closure member not being directly connected to the lever, a stabilizer element frictionally abutting a pivot pin as the lever rotates to thereby stabilize movement of the lever, an adjustment member that translates rotational movement of an adjustment cap into compression or decompression of a biasing element without applying a rotational force to the biasing element, and/or the cap including a tab configured to be selectively inserted at least one slot on the housing to prevent rotation of the adjustment cap.

32 Claims, 9 Drawing Sheets

U.S. PATENT DOCUMENTS

| | | | |
|---|---|---|---|
| 3,488,685 A | 1/1970 | Hughes | |
| 3,590,849 A | 7/1971 | Austin | |
| 3,900,045 A | 8/1975 | Murrell | |
| 3,974,851 A | 8/1976 | Garretson | |
| 4,043,357 A * | 8/1977 | Gocke | 137/495 |
| 4,069,839 A | 1/1978 | Hughes | |
| 4,491,149 A | 1/1985 | Trinkwalder | |
| RE31,932 E | 7/1985 | Christianson | |
| 4,542,852 A | 9/1985 | Orth et al. | |
| 4,724,867 A | 2/1988 | Gillespie, III et al. | |
| 4,760,862 A * | 8/1988 | Mutou et al. | 137/505.42 |
| 4,974,630 A | 12/1990 | Chang | |
| 5,131,425 A | 7/1992 | Sturgis | |
| 5,402,820 A | 4/1995 | Duffy et al. | |
| 5,586,569 A * | 12/1996 | Hanning et al. | 137/505 |
| 5,735,306 A | 4/1998 | Olds et al. | |
| 5,996,617 A | 12/1999 | Olds et al. | 137/505.46 |
| 6,047,728 A * | 4/2000 | Eidsmore | 137/505.42 |
| 6,431,205 B1 | 8/2002 | Bartos | 137/505.46 |
| 6,668,855 B2 | 12/2003 | Heald et al. | |
| 2003/0005962 A1 | 1/2003 | Lin | |
| 2004/0007270 A1 | 1/2004 | Olds | |

FOREIGN PATENT DOCUMENTS

| | | |
|---|---|---|
| DE | 2510235 | 3/1975 |
| EP | 0907119 | 4/1999 |

OTHER PUBLICATIONS

Fisher Controls International, Inc., Regulator Type R522H, Sep. 1991 (1 page).

ECII® Regulator Designs, ECII Regulators and Accessories, p. 9, date unknown.

* cited by examiner

PRESSURE REGULATOR WITH IMPROVED OUTLET PRESSURE CONTROL

CROSS-REFERENCE TO RELATED APPLICATION

The present application claims priority to Provisional Patent Application Ser. No. 60/541,594, filed on Feb. 4, 2004, entitled PRESSURE REGULATOR WITH IMPROVED OUTLET PRESSURE CONTROL.

BACKGROUND OF THE INVENTION

This invention is applicable to a wide range of gas pressure-regulating applications, but is designed for particularly advantageous use in propane outdoor cooking appliance applications.

Heretofore, the gas pressure output of a pressure regulator has been controlled by applying the inlet pressure against a flexible diaphragm surface area that is balanced with a spring force set at or adjusted to the desired output gas pressure. Most regulators using flexible diaphragms, however, have not had a direct-acting mechanism between the regulating valve and the diaphragm. Therefore, more parts are needed to control the flow of the gas, and regulation is often not as well controlled and accurate as desired. Also, the pressure regulators had to be large and expensive because of all of the elements needed to control the gas pressure. Furthermore, such pressure regulators typically require gas pressure in the outlet gas line to operate the regulating device and to shut off the flow of gas. If a positive shut-off is required as a safety measure, a separate shut-off valve had to be placed at the outlet of the regulator to prevent the flow of gas downstream. Such a separate shut-off valve adds further expense.

Accordingly, an apparatus which avoids the aforementioned disadvantages and has the aforementioned desired features has long been desired.

SUMMARY OF THE PRESENT INVENTION

An aspect of the present invention is to provide a pressure regulator comprising a housing, a pivoting lever, a diaphragm and a closure member. The housing has an inlet port and an outlet port. The pivoting lever is for selectively covering a section of a passage between the inlet port and the outlet port. The diaphragm is interconnected to the pivoting lever to rotate the lever in reaction to pressure levels in the housing. The closure member abuts the pivoting lever and covers the section of the passage to prevent fluid flow through the passage. The closure member is not directly connected to the pivoting lever.

Another aspect of the present invention is to provide a method of assembling a pressure regulator comprising providing a housing having an inlet port and an outlet port. The method also includes positioning a pivoting lever in the housing for selectively covering a section of a passage between the inlet port and the outlet port. The method further includes interconnecting a diaphragm to the pivoting lever to rotate the lever in response to pressure levels in the housing. The method also includes abutting a closure member against the pivoting lever to move with the pivoting lever, with the closure member being configured to cover the section of the passage to prevent fluid flow through the passage and the closure member not being directly connected to the pivoting lever.

Yet another aspect of the present invention is to provide a pressure regulator comprising a housing, a pivoting lever, a diaphragm, a stabilizer element and a pivot pin. The housing has an inlet port and an outlet port. The pivoting lever is for selectively covering a section of a passage between the inlet port and the outlet port. The diaphragm is interconnected to the pivoting lever to rotate the lever in reaction to pressure levels in the housing. The stabilizer element is movable with the pivoting lever. The pivot pin is in the housing, with the pivoting lever pivoting on the pivot pin. The stabilizer element frictionally abuts a portion of the pivot pin as the pivoting lever rotates to thereby stabilize movement of the pivoting lever.

A further aspect of the present invention is to provide a pressure regulator comprising a housing, a diaphragm, a member, a rotatable cap, a biasing element and an adjustment member. The housing has an internal chamber, an inlet port fluidly connected to the internal chamber and an outlet port fluidly connected to the internal chamber. The diaphragm divides the internal chamber into a lower chamber and an upper chamber. The member is located in the internal chamber and interconnected to the diaphragm. The member has a first position stopping fluid flow between the inlet port and the outlet port and a second position allowing fluid flow between the inlet port and the outlet port. The rotatable adjustment cap is connected to the housing. The biasing element applies a force to the diaphragm to bias the member towards the second position. The adjustment member interconnects the rotatable adjustment cap to the biasing element. Rotation of the rotatable adjustment cap alternatively compresses the biasing element to increase the force applied to the diaphragm and decompresses the biasing element to decrease the force applied to the diaphragm. The adjustment member translates rotational movement of the adjustment cap into compression or decompression of the biasing element without applying a rotational force to the biasing element.

Another aspect of the present invention is to provide a pressure regulator comprising a housing, a diaphragm, a member, a rotatable adjustment cap and a biasing element. The housing has an internal chamber, an inlet port fluidly connected to the internal chamber and an outlet port fluidly connected to the internal chamber. The housing further has at least one slot. The diaphragm divides the internal chamber into a lower chamber and an upper chamber. The member is located in the internal chamber and interconnected to the diaphragm. The member has a first position stopping fluid flow between the inlet port and the outlet port and a second position allowing fluid flow between the inlet port and the outlet port. The rotatable adjustment cap is connected to the housing. The biasing element engages the diaphragm to bias the member towards the second position. Rotation of the rotatable adjustment cap alternatively compresses the biasing element to increase the force applied to the diaphragm and decompresses the biasing element to decrease the force applied to the diaphragm. The rotatable adjustment cap includes a tab configured to be selectively inserted into the at least one slot to prevent rotation of the adjustment cap.

The principal objects of the present invention include providing a pressure regulator having an easy to use spring adjustment feature, stabilizing element and sealing disc retention. The pressure regulator is efficient in use, economical to manufacture, capable of a long operable life, and particularly adapted for the proposed use.

Other objects, advantages and features of the invention will become apparent upon consideration of the following detailed description, when taken in conjunction with the accompanying drawings. The above brief description sets forth rather broadly the more important features of the present disclosure so that the detailed description that follows may be better understood, and so that the present contributions to the art may be better appreciated. There are, of course, additional features of the disclosure that will be described hereinafter which will form the subject matter of the claims appended hereto.

In this respect, before explaining the preferred embodiment of the disclosure in detail, it is to be understood that the disclosure is not limited in its application to the details of the construction and the arrangements set forth in the following description or illustrated in the drawings. The pressure regulator of the present disclosure is capable of other embodiments and of being practiced and carried out in various ways. Also, it is to be understood that the phraseology and terminology employed herein are for description and not limitation. Where specific dimensional and material specifications have been included or omitted from the specification or the claims, or both, it is to be understood that the same are not to be incorporated into the appended claims.

As such, those skilled in the art will appreciate that the conception, upon which this disclosure is based, may readily be used as a basis for designing other structures, methods, and systems for carrying out the several purposes of the present invention. It is important, therefore, that the claims are regarded as including such equivalent constructions as far as they do not depart from the spirit and scope of the present invention.

Further, the purpose of the Abstract is to enable the U.S. Patent and Trademark Office and the public generally, and especially the scientists, engineers and practitioners in the art who are not familiar with the patent or legal terms of phraseology, to learn quickly from a cursory inspection the nature and essence of the technical disclosure of the application. Accordingly, the Abstract is intended to define neither the invention nor the application, which is only measured by the claims, nor is it intended to be limiting as to the scope of the invention in any way.

These and other objects, along with the various features and structures that characterize the invention, are pointed out with particularity in the claims annexed to and forming a part of this disclosure. For a better understanding of the pressure regulator of the present disclosure, its advantages and the specific objects attained by its uses, reference should be had to the accompanying drawings and descriptive matter in which there are illustrated and described the preferred embodiments of the invention.

While embodiments of the pressure regulator are herein illustrated and described, it is to be appreciated that various changes, rearrangements and modifications may be made therein, without departing from the scope of the invention as defined by the appended claims.

BRIEF DESCRIPTION OF THE DRAWINGS

The following brief description of the figures, and the related figures themselves, exemplifies a particular preferred embodiment of the invention constituting the best mode presently contemplated. As will be understood, other embodiments of the invention as well as changes and variations in the particular structure shown in these figures are no doubt possible, and may very well suggest themselves to those skilled in the art after studying this disclosure and these figures.

DETAILED DESCRIPTION OF PREFERRED EMBODIMENT

Figure 1:
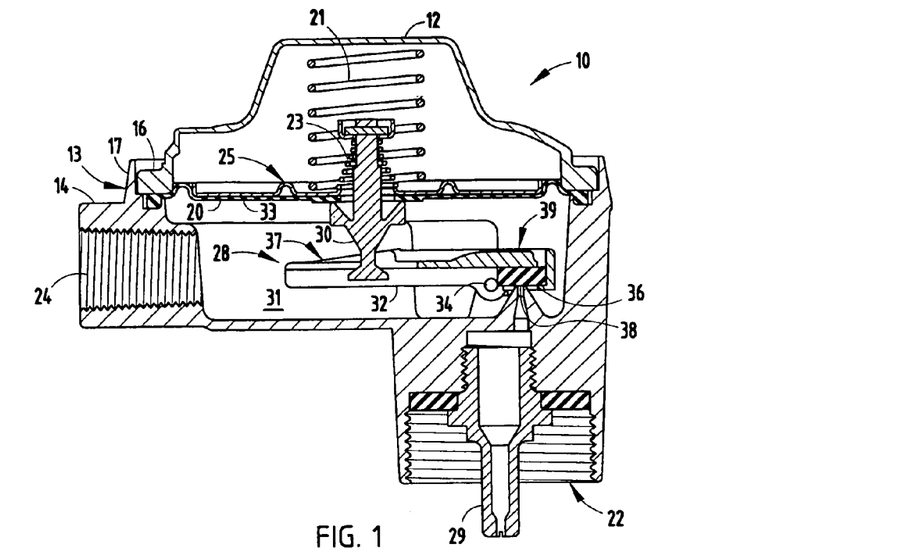
FIG. 1 is a cross-sectional side view of a pressure regulator in accordance with the present invention.
Figure 2:
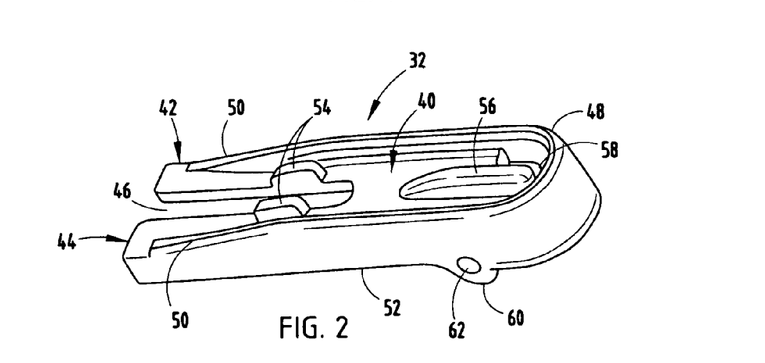
FIG. 2 is a perspective view of an actuating lever in accordance with the present invention.

For purposes of description herein, the terms "upper," "lower," "right," "left," "rear," "front," "vertical," "horizontal," and derivatives thereof shall relate to the invention as orientated in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The reference number 10 (FIG. 1) generally designates a pressure regulator embodying the present invention. In the illustrated example, the pressure regulator 10 has an upper body 12 (sometimes called the "bonnet") and a lower body 14. The upper body 12 and the lower body 14 may be substantially cylindrical. The lower body 14 is connected to the upper body 12 by mechanically deforming, or crimping, an upstanding flange 17 on the outside of an upper portion 13 of the lower body 14 over an outer flange 16 of the upper body 12. The crimp could also be reversed with a downward flange on the outside of the lower end of the upper body 12 and an outer flange on the lower body 14. Alternatively, the upper body 12 can have an outer flange at a lower end, which connects to the upper portion 13 of the lower body 14 by a plurality of threaded fasteners. The outer surface of the lower body 14 has an inlet port 22 and an outlet port 24 positioned perpendicular to the inlet port 22. In use, the inlet port 22 has a probe 29 therein for connection to a source of fuel, e.g., gas (not shown), and the outlet port 24 is connected to an outdoor cooking appliance (not shown).

In the illustrated example, the pressure regulator 10 includes a regulating assembly 28 for controlling the flow of fluid from the inlet port 22 to the outlet port 24. The regulating assembly 28 is located within a regulator cavity 31 defined by the upper body 12 and the lower body 14. The regulating assembly 28 includes a diaphragm 20, a stem-like actuator 30, a first spring 21 between the diaphragm 20 and the upper body 12, a second spring 23 between the diaphragm 20 and the stem-like actuator 30 and an actuating lever 32. The diaphragm 20 is clamped between the lower body 14 and the upper body 12. The diaphragm 20 is biased downwardly by the first spring 21, which acts against the top of the diaphragm 20 (via a support plate 25). The diaphragm 20 is connected to the stem-like actuator 30 via the second spring 23. The stem-like actuator 30 can apply movement to a first end portion 37 of the actuating lever 32. The actuating lever 32 is pivotally mounted inside the lower body 14 by a pin 34. A second end portion 39 of the lever 32 opposite the actuator 30 and the first end portion 37 carries a sealing disc 36 which controls the amount of gas allowed to flow from the inlet port 22 through an orifice 38 in the lower body 14 and out of the outlet port 24 by selectively covering the orifice 38.

During typical use of the illustrated pressure regulator 10, fluid flows through the pressure regulator 10 from the source of fuel, though the inlet port 22 (typically via the probe 29), through the orifice 38, into the regulator cavity 31 of the pressure regulator 10, through the outlet port 24 and to the outdoor cooking appliance. However, when pressure in the regulator cavity 31 raises above a certain level, the gas in the regulator cavity 31 will press against an underside 33 of the diaphragm 20 and move the diaphragm 20 upward against the bias of the spring 21. In this situation, the upward movement of the diaphragm 20 will cause the second spring 23 to compress, thereby forcing the stem-like actuator 30 upwards. Upward movement of the stem-like actuator 30 will force the first end portion 37 of the actuating lever 32 to move upward, thereby forcing the actuating lever 32 to rotate about the pin 34 and thus move the sealing disc 36 to cover the orifice 38. Accordingly, when the pressure in the regulator cavity 31 is above a certain level, the sealing disc 36 will cover the orifice 38 and prevent fluid flow through the orifice 38 and into the regulator cavity 31 of the pressure regulator 10.

Figure 3:
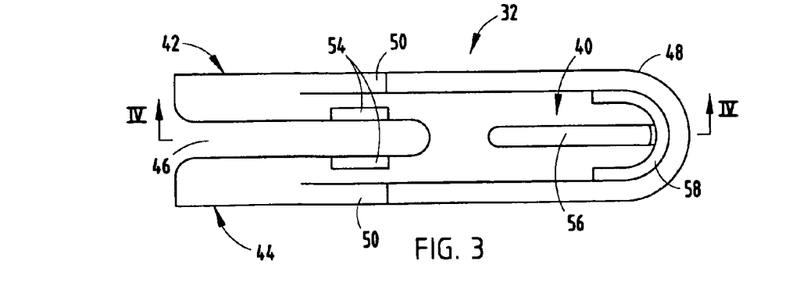
FIG. 3 is a top view of the actuating lever in accordance with the present invention.
Figure 4:
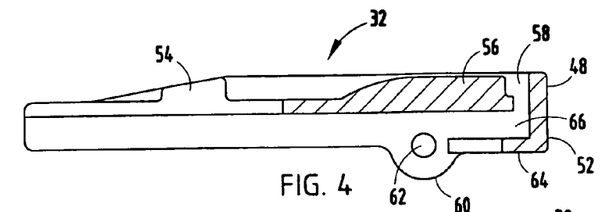
FIG. 4 is a cross-sectional view of the actuating lever in accordance with the present invention taken along the line IV-IV of FIG. 3.
Figure 5:
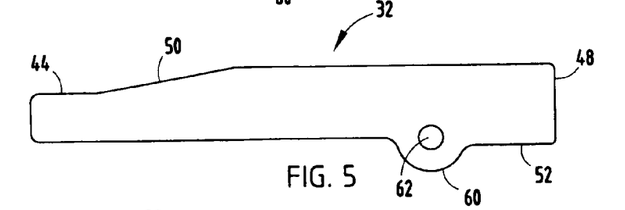
FIG. 5 is a side view of the actuating lever in accordance with the present invention.
Figure 6:
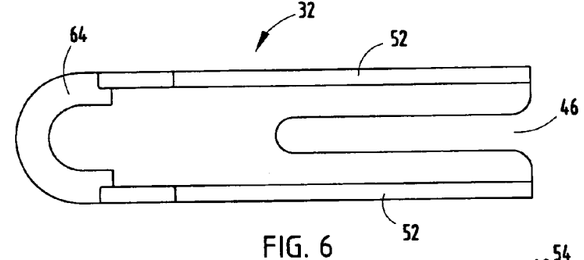
FIG. 6 is a bottom view of the actuating lever in accordance with the present invention.
Figure 7:
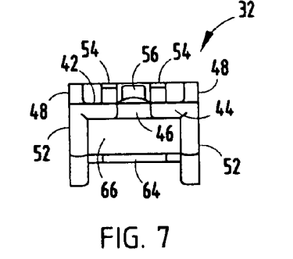
FIG. 7 is a front view of the actuating lever in accordance with the present invention.

The illustrated actuating lever 32 (FIGS. 2-7) is substantially U-shaped when viewed from the top (FIG. 3) and comprises a base 40, a first leg 42 and a second leg 44. The first leg 42 and the second leg 44 extend from the base 40 and have a slot 46 therebetween. A U-shaped upstanding wall 48 extends upwardly from the base 40, the first leg 42 and the second leg 44, with ends 50 of the U-shaped upstanding wall 48 tapering towards a top surface of the first leg 42 and the second leg 44. The actuating lever 32 also includes a U-shaped downwardly depending skirt 52 extending downward from the base 40, the first leg 42 and the second leg 44. The U-shaped downwardly depending skirt 52 and the U-shaped upstanding wall 48 are co-extensive and define a U-shaped periphery of the actuating lever 32. The first leg 42 and the second leg 44 each include an upstanding flange 54 adjacent the slot 46 and parallel the U-shaped upstanding wall 48. The upstanding flanges 54 straddle the stem-like actuator 30 (FIG. 1). The base 40 includes a support fin 56. A U-shaped opening 58 is located between a front of the base 40 and the U-shaped upstanding wall 48 and the U-shaped downwardly depending skirt 52.

Figure 8:
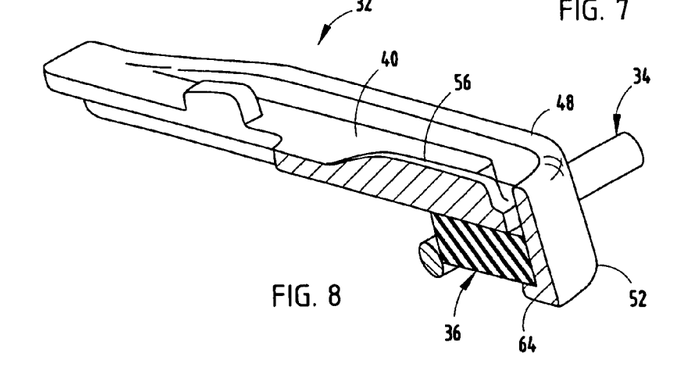
FIG. 8 is a cross-sectional perspective view of the actuating lever in accordance with the present invention taken along the line IV-IV of FIG. 3, along with a pin and a sealing disc.

In the illustrated example, the pin 34 mounts the actuating lever 32 to the lower body 14 and holds the sealing disc 36 in position on the actuating lever 32. The U-shaped downwardly depending skirt 52 of the actuating lever 32 includes a pair of parallel ears 60, with the ears 60 having coextensive holes 62 for accepting the pin 34 therethrough. The U-shaped downwardly depending skirt 52 of the actuating lever 32 also includes a U-shaped lip 64 at a bottom of the U-shaped downwardly depending skirt 52, extending under the base 40. A bottom surface of the base 40, a front of the U-shaped downwardly depending skirt 52 and the U-shaped lip 64 define a sealing disc receiving pocket 66. As illustrated in FIGS. 1 and 8, the sealing disc 36 is placed into the sealing disc receiving pocket 66 before the pin 34 is placed through the holes 62. Once the pin 34 is placed through the holes 62, the pin 34 will maintain the sealing disc 36 in the sealing disc receiving pocket 66.

Maintaining the sealing disc 36 in the sealing disc receiving pocket 66 can result in several advantages. First, the sealing disc 36 does not need secondary operations, such as staking or riveting, to maintain the sealing disc 36 in position on the actuating lever 32. Eliminating the secondary operations not only lowers the overall cost of the pressure regulator 10, but also eliminates inherent problems encountered during staking or riveting the sealing disc 36 (e.g., distorting the sealing disc or introducing metal fragments onto a rubber sealing surface). Second, since the sealing disc 36 will rub against the pin 34 during rotation of the actuating lever 32, the associated friction can stabilize any harmonic motions that could cause undesirable humming. However, it is contemplated that the sealing disc 36 could be placed relative to the pin 34 such that the resulting friction is maximized or reduced to almost zero.

The reference numeral 10a (FIGS. 9-26) generally designates another embodiment of the present invention, having a second embodiment of the pressure regulator. Since pressure regulator 10a is similar to the previously described pressure regulator 10, similar parts appearing in FIGS. 1-8 and FIGS. 9-26, respectively, are represented by the same, corresponding reference number, except for the suffix "a" in the numerals of the latter. The illustrated pressure regulator 10a includes an adjustment assembly 68 for selectively adjusting the pressure applied to the top surface of the diaphragm 20a and for positively shutting off the flow of fluid through the orifice 38a.

In the illustrated example, the adjustment assembly 68 can selectively adjust the pressure applied to the top surface of the diaphragm 20, thereby regulating the amount of pressure needed in the cavity 31a to force the actuating lever 32a to move the sealing disc 36a over the orifice 38a to cover the orifice 38a. The adjustment assembly 68 includes a spring adjustment guide 70, an adjustment knob 72 and a knob cap 74. The adjustment knob 72 and the knob cap 74 connect to the upper body 12a and move the spring adjustment guide 70.

Figure 9:
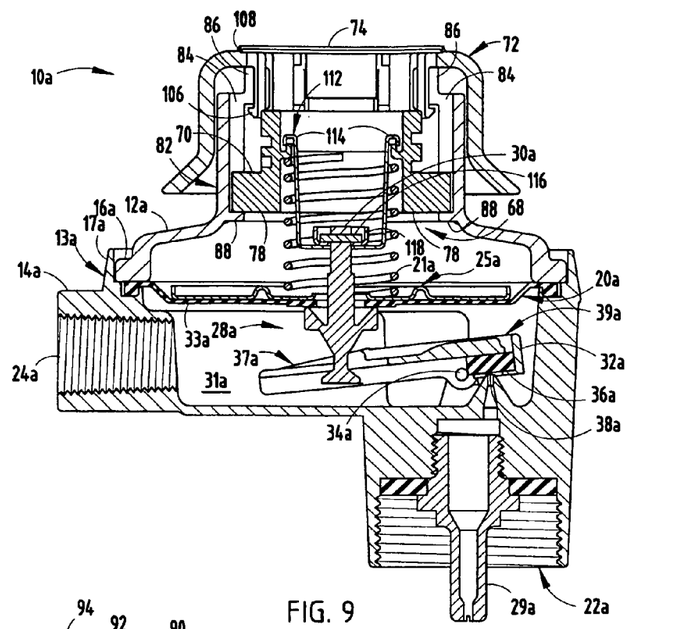
FIG. 9 is a cross-sectional view of a pressure regulator in accordance with a second embodiment of the present invention.
Figure 10:
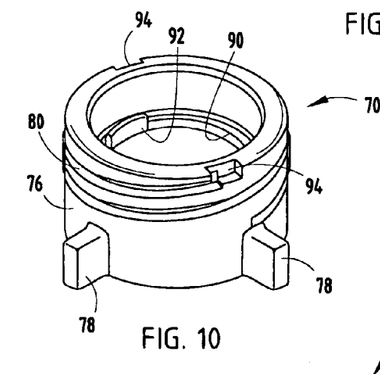
FIG. 10 is a perspective view of a spring adjustment guide in accordance with the second embodiment of the present invention.
Figure 11:
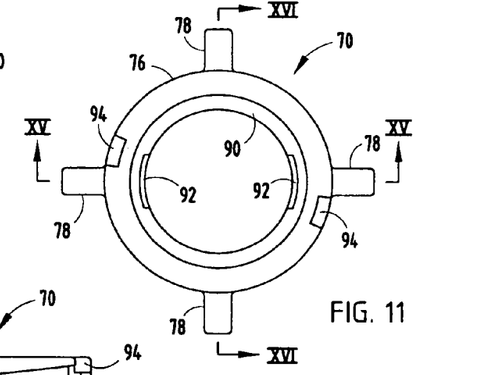
FIG. 11 is a top view of the spring adjustment guide in accordance with the second embodiment of the present invention.
Figure 12:
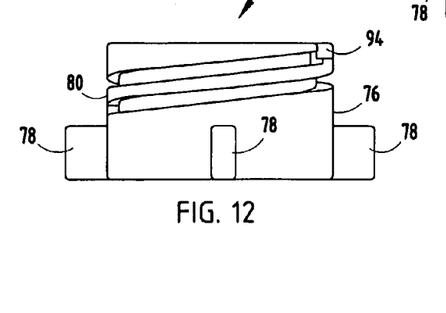
FIG. 12 is a front view of the spring adjustment guide in accordance with the second embodiment of the present invention.
Figure 13:
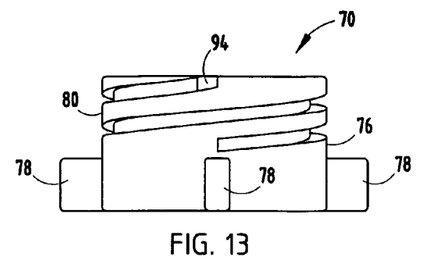
FIG. 13 is a side view of the spring adjustment guide in accordance with the second embodiment of the present invention.
Figure 14:
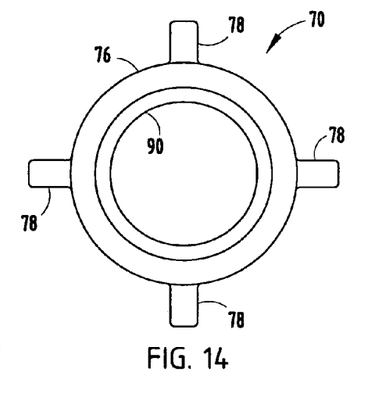
FIG. 14 is a bottom view of the spring adjustment guide in accordance with the second embodiment of the present invention.
Figure 15:
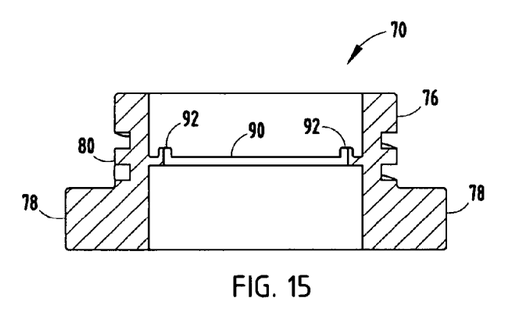
FIG. 15 is a cross-sectional view of the spring adjustment guide in accordance with the second embodiment of the present invention taken along the line XV-XV of FIG. 11.
Figure 16:
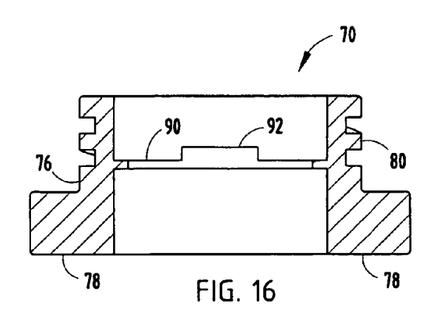
FIG. 16 is a cross-sectional view of the spring adjustment guide in accordance with the second embodiment of the present invention taken along the line XVI-XVI of FIG. 11.
Figures 17, 18, 19, 20:
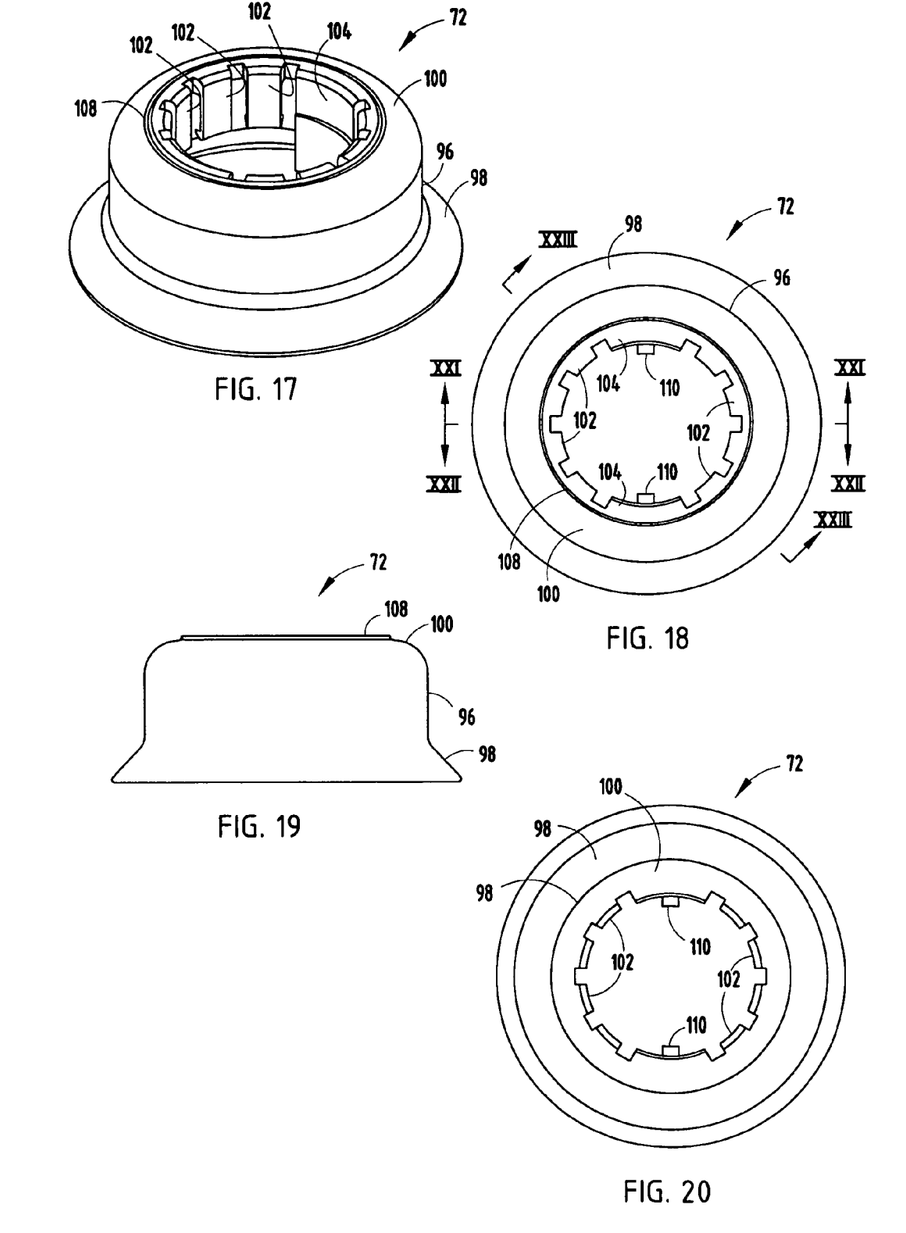
FIG. 17 is a perspective view of an adjustment knob in accordance with the second embodiment of the present invention.
FIG. 18 is a top view of the adjustment knob in accordance with the second embodiment of the present invention.
FIG. 19 is a side view of the adjustment knob in accordance with the second embodiment of the present invention.
FIG. 20 is a bottom view of the adjustment knob in accordance with the second embodiment of the present invention.
Figure 21:
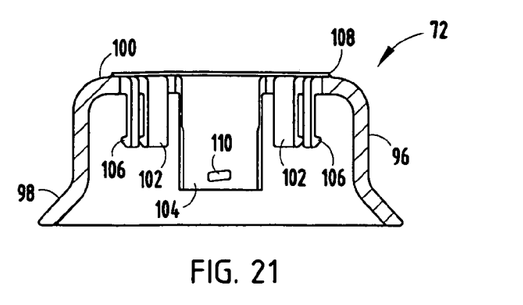
FIG. 21 is a cross-sectional view of the adjustment knob in accordance with the second embodiment of the present invention taken along the line XXI-XXI of FIG. 18.
Figure 22:
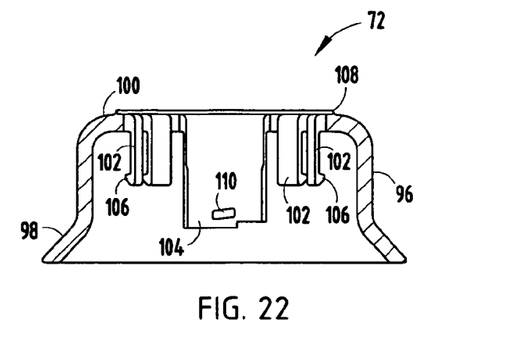
FIG. 22 is a cross-sectional view of the adjustment knob in accordance with the second embodiment of the present invention taken along the line XXII-XXII of FIG. 18.
Figure 23:
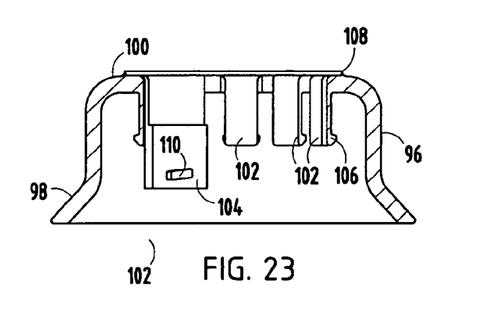
FIG. 23 is a cross-sectional view of the adjustment knob in accordance with the second embodiment of the present invention taken along the line XXIII-XXIII of FIG. 18.
Figure 24:
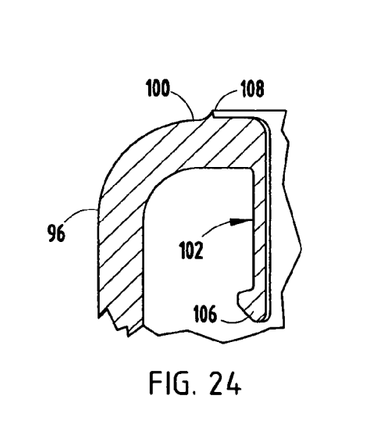
FIG. 24 is an enlarged view of an upper portion of the adjustment knob in accordance with the second embodiment of the present invention.
Figure 25:
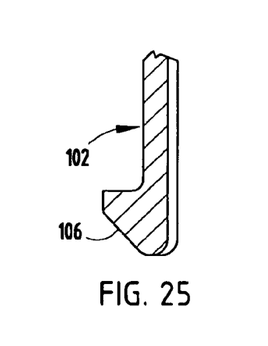
FIG. 25 is an enlarged view of a clip of the upper portion of the adjustment knob in accordance with the second embodiment of the present invention.
Figure 26:
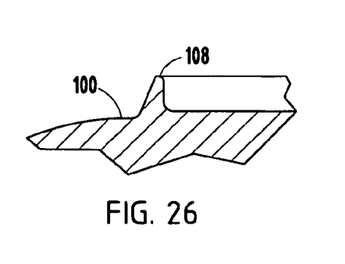
FIG. 26 is an enlarged view of a prong of the upper portion of the adjustment knob in accordance with the second embodiment of the present invention.
Figure 27:
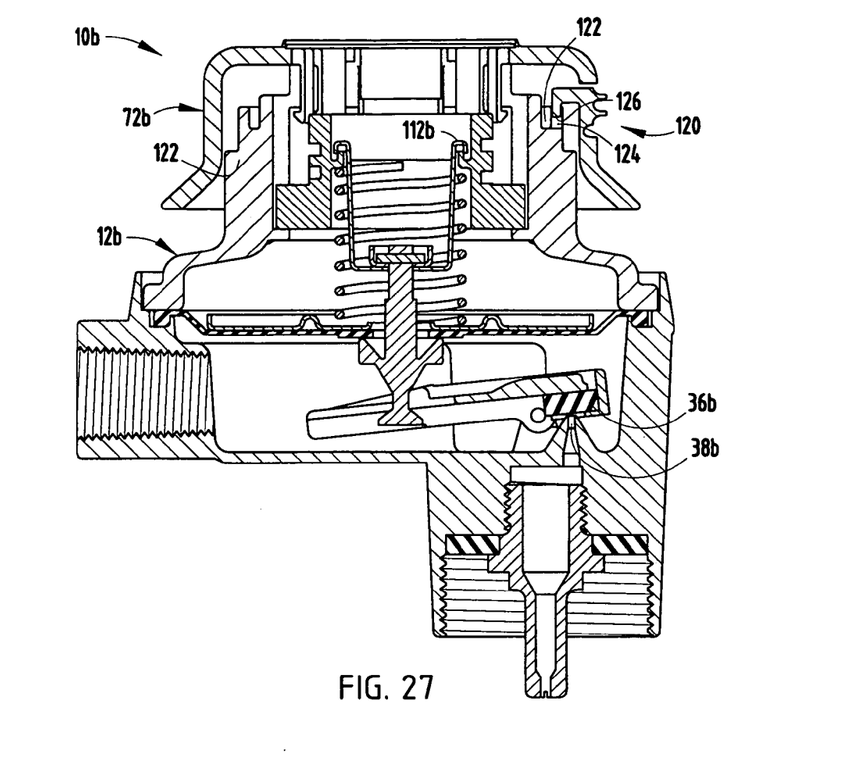
FIG. 27 is a cross-sectional perspective view of a pressure regulator in accordance with a third embodiment of the present invention.
Figure 28:
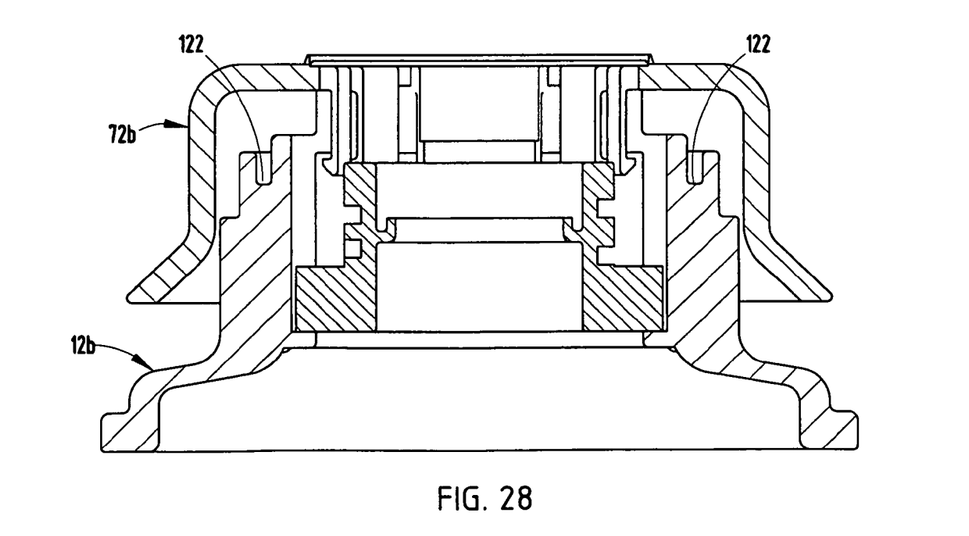
FIG. 28 is a cross-sectional perspective view of an upper body, an adjustment knob and a spring adjustment guide of the pressure regulator in accordance with the third embodiment of the present invention.

The illustrated spring adjustment guide 70 (FIGS. 10-16) moves vertically within the upper body 12a of the pressure regulator 10a. The spring adjustment guide 70 includes a cylindrical shell 76 having four outwardly extending ribs 78 and an outside threaded top 80 for moving the spring adjustment guide 70 vertically within the upper body 12a of the pressure regulator 10a. As illustrated in FIG. 9, the upper body 12a of the pressure regulator 10a includes an upper cylindrical portion 82 having four slots 84 and an upper interrupted catch 86. The spring adjustment guide 70 fits into the upper body 12a of the pressure regulator 10a by sliding the ribs 78 extending from the cylindrical shell 76 of the spring adjustment guide 70 into the slots 84 in the upper cylindrical portion 82 of the upper body 12a. The ribs 78 are able to slide within the slots 84 until the ribs 78 abut a tab 88 at a bottom of the slots 84. The spring adjustment guide 70 further includes an inside circular rib 90 having a pair of hooks 92. The inside circular rib 90 abuts against the top of the first spring 21a to compress the first spring 21a and therefore apply a greater pressure against the top of the diaphragm 20a. The outside threaded top 80 of the cylindrical shell 76 and a pair of notches 94 of the spring adjustment guide 70 cooperate with the adjustment knob 72 and the knob cap 74 to move the spring adjustment guide 70 vertically within the upper body 12a of the pressure regulator 10a without rotating the first spring 21a.

In the illustrated example, the adjustment knob 72 (FIGS. 17-26) connects to the upper body 12a of the pressure regulator 10a and moves the spring adjustment guide 70 vertically. The adjustment knob 72 comprises a cylindrical sleeve 96 having an outwardly flared bottom 98, a top ring 100 extending inwardly from a top of the cylindrical sleeve 96, a plurality of clips 102 extending from the top ring 100 and a pair of screw panels 104 extending from the top ring 100. The clips 102 and the screw panels 104 extend downwardly from the top ring 100. The clips 102 are arcuate and include an outwardly facing tab 106 at a bottom thereof. In the illustrated example, four clips 102 are located between each of the screw panels 104, for a total of eight clips 102. However, it is contemplated that any number of clips 102 could be used. The clips 102 fit within the upper cylindrical portion 82 of the upper body 12a and the tabs 106 of the clips 102 snap under the interrupted catch 86 of the upper body 12a to connect the adjustment knob 72 to the upper body 12a. Therefore, when the adjustment knob 72 is connected to the upper body 12a, the cylindrical sleeve 96 of the adjustment knob 72 surrounds the upper cylindrical portion 82 of the upper body 12a. The adjustment knob 72 also includes an annular flange 108 (see FIGS. 24 and 26) extending from a top surface of the top ring 100. The knob cap 74 is a planar circular plate and is connected to the adjustment knob 72 by inserting the knob cap 74 within the annular flange 108 extending from the top ring 100 of the adjustment knob 72.

The illustrated adjustment knob 72 is rotated to move the spring adjustment guide 70 vertically. Each screw panel 104 of the adjustment knob 72 includes a slanted projection 110. The slanted projections 110 fit into the notches 94 and threads on the outside threaded top 80 of the spring adjustment guide 70. As the adjustment knob 72 is rotated, the slanted projections 110 move in the threads of the outside threaded top 80 of the spring adjustment guide 70 to move the spring adjustment guide 70 up and down. As the spring adjustment guide 70 moves up and down, the inside circular rib 90 of the spring adjustment guide 70 compresses the first spring 21a and allows the first spring 21a to expand, respectively, to thereby alter the force applied to the top of the diaphragm 20a.

In the illustrated example, the adjustment assembly 68 can be used to positively stop fluid flow through the pressure regulator 10a. A shut-off clip 112 works with the adjustment knob 72 and the spring adjustment guide 70 to positively force the first end 37a of the stem-like actuator 30a upward, thereby forcing the sealing disc 36a over the orifice 38a. The shut-off clip 112 is U-shaped and includes a pair of top clasps 114. The top clasps 114 fit over the pair of hooks 92 of the inside circular rib 90 of the spring adjustment guide 70. Therefore, when the adjustment knob 72 is rotated to move the spring adjustment guide 70 upward, the hooks 92 of the spring adjustment guide 70 will force the shut-off clip 112 upward. The shut-off clip 112 includes a bottom opening surrounding the stem-like actuator 30a. A retainer 116 and a control plate 118 are connected to a top of the stem-like actuator 30a, with the control plate 118 extending over a bottom of the shut-off clip 112. Therefore, when the shut-off clip 112 is forced upward, the shut-off clip 112 will force the retainer 116, control plate 118 and the stem-like actuator 30a upward, thereby forcing the first end 37a of the stem-like actuator 30a upward and the sealing disc 36a over the orifice 38a. Hence, rotating the adjustment knob 72a to move the spring adjustment guide 79 upward will positively close the pressure regulator 10a. It is contemplated that the shut-off clip 112 could have any shape and provide the same function of forcing the retainer 116, control plate 118 and first end 37a of the stem-like actuator 30a upward to seal the orifice. For example, the shut-off clip could be flat or cup shaped. Therefore, the pressure regulator 10a of the second embodiment can be positively shut off to the flow of fluid through the pressure regulator 10a without any gas pressure under the diaphragm 20a.

In the illustrated example, the pressure regulator 10a will regulate the fluid pressure to the outlet port 24a by allowing fluid to flow through the inlet port 22a and into the regulator cavity 31a through the orifice 38a. The fluid will then finally exit out of the pressure regulator 10a through the outlet port 24a. The fluid in the regulator cavity 31a below the diaphragm 20a will apply a pressure to the diaphragm 20a which, when balanced against the spring force applied to the top of the diaphragm 20a by the first spring 21a, determines the pressure in the outlet port 24a. In a steady state condition, the diaphragm 20a will keep the sealing disc 36a sufficiently away from the orifice 38a to allow fluid to flow at a near constant pressure through the pressure regulator 10a. However, if the pressure of the fluid at the outlet port 24a and the regulator cavity 31a rises, it will force the diaphragm 20a and the first spring 21a upward. When the diaphragm 20a is forced upwards, the stem-like actuator 30a and first end portion 37a of the actuating lever 32a will move upward and force the sealing disc 36a into contact with the orifice 38a, thereby decreasing the flow of fluid to the outlet port 24a. When the pressure in the outlet port 24a and the regulator cavity 31a below the diaphragm 20a is reduced, the diaphragm 20a under the force of the first spring 21a above it will move downward, thereby lowering the stem-like actuator 30a and the first end portion 37a of the actuating lever 32a, thereby moving the sealing disc 36a away from the orifice 38a. Fluid will then again flow through the pressure regulator 10a. When the adjustment knob 72 is rotated to move the spring adjustment guide 70 downward, the downward movement of the spring adjustment guide 70 will thereby compress the first spring 21a between the inside circular rib 90 of the spring adjustment guide 70 and the support plate 25a. If the first spring 21a is compressed beyond a predetermined point, the spring 21 will force the support plate 25a and the diaphragm 20a to move downward. Therefore, rotating the adjustment knob 72 to move the spring adjustment guide 70 downward will force the first spring 21a and the stem-like actuator 30a downward due to compression of the first spring 21a. Consequently, first end portion 37a of the actuating lever 32a will move downward and the sealing disc 36a will move away from the orifice 38a, thereby opening the pressure regulator 10a. Hence, rotating the adjustment knob 72 to move the spring adjustment guide 70 downward will increase the pressure regulator 10 outlet flow.

Every time the adjustment knob 72 is rotated to move the spring adjustment guide 70 downward, a new steady-state condition is created for the pressure regulator 10a, whereby the sealing disc 36a is located a further distance from the orifice 38a, thereby allowing more fluid to pass through the pressure regulator 10a. As discussed previously, however, if the pressure of the fluid leaving the outlet port 24a rises above the downward force of the first spring 21a in each such steady state condition, the fluid pressure in the outlet port 24a and in the regulator cavity 31a below the diaphragm 20a will force the diaphragm 20a upwards. When the diaphragm 20a is forced upwards, the second spring 23a (not shown in the FIGS.) will force the stem-like actuator 30a and the first end portion 37a of the actuating lever 32a upwards and force the sealing disc 36a toward the orifice 38a, thereby decreasing the flow of fluid into the outlet port 24a. When the pressure in the outlet port 24a and the regulator cavity 31a below the diaphragm 20a decreases to a desired level, the first spring 21a will move the diaphragm 20a lower, thereby lowering the stem-like actuator 30a and the first end portion 37a of the actuating lever 32a and moving the sealing disc 36a away from the orifice 38a. Fluid flow will then increase through the pressure regulator 10a. It is noted that the second embodiment of the pressure regulator 10a could have the diaphragm 20a and/or the support plate 25a directly connected to the stem-like actuator 30a, thereby removing the second spring.

Figure 29:
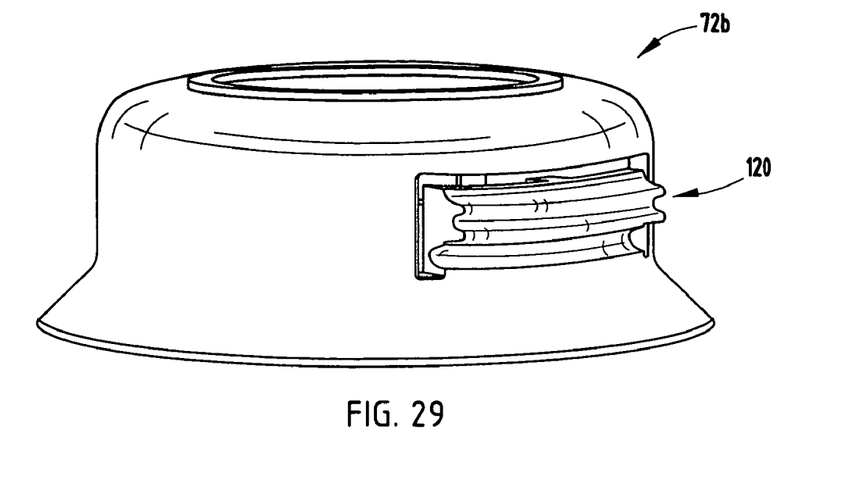
FIG. 29 is a perspective view of the adjustment knob in accordance with the third embodiment of the present invention.
Figure 30:
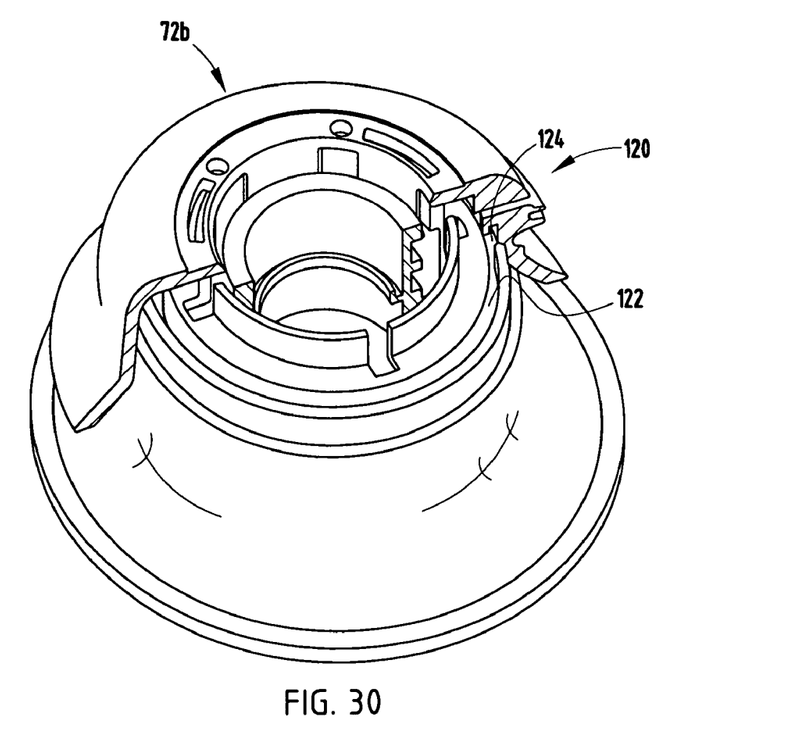
FIG. 30 is a perspective view of the upper body and a cross-sectional perspective view of the adjustment knob and the spring adjustment guide of the pressure regulator in accordance with the third embodiment of the present invention.

The reference number 10b (FIGS. 27-30) generally designates a third embodiment of the present invention, comprising a pressure regulator having additional features. Since pressure regulator 10b is essentially similar to the previously described pressure regulator 10a in many ways, similar parts appearing in FIG. 9-26 and FIGS. 27-30, respectfully, are represented by the same, corresponding reference numeral, except for the suffix "b" in the numerals of the latter. The illustrated adjustment knob 72b of the pressure regulator 10b includes a latch 120 for locking the adjustment knob 72b in a closed position. The upper body 12b of the pressure regulator 10b includes a circular upwardly facing groove 122 with a slot 124. The latch 120 includes a tab 126 configured to be accepted into the slot 124 for locking the adjustment knob 72b in the closed position. When the latch 120 (see FIG. 29) is depressed, the tab 126 will move out of the slot 124 and the adjustment knob 72b can rotate with the tab 126 moving in the circular upwardly facing groove 122. When the adjustment knob 72b is in the closed position, the shut-off clip 112b is moved to its uppermost position, thereby moving the sealing disc 36b to cover the orifice 38b, and stopping fluid flow through the pressure regulator 10b.

The reference numeral 10c (FIGS. 31-34) generally designates another embodiment of the present invention, having a fourth embodiment of the pressure regulator. Since pressure regulator 10c is similar to the previously described pressure regulator 10, similar parts appearing in FIGS. 1-8 and FIGS. 31-34, respectively, are represented by the same, corresponding reference number, except for the suffix "a" in the numerals of the latter. The illustrated pressure regulator 10c includes a stabilizer element 200 for stabilizing rotation of an actuating lever 202 about the pin 34c.

In the illustrated embodiment, the actuating lever 202 (see FIG. 32) includes the sealing disc 36c in a lower slot opening 206 in the actuating lever 202, a top surface 208, a pair of legs 210 defining a channel 212 therebetween and a front lip 214 defining a front of the channel 212. The pair of legs 210 each include an opening for accepting the pin 34c therein. The stabilizer element 200 is substantially located in the channel 212 and includes a tab 216 on the front lip 214.

The illustrated stabilizer element 200 frictionally engages the pin 34c to stabilize rotation of the actuating lever 202. The stabilizer element 200 is a single piece of resiliently flexible material and includes a rear portion 220 engaging the top surface 208 of the actuating lever 202 in the channel 212, a resiliently flexible portion 204 engaging the pin 34c and a front portion 222 having the tab 216 on the front lip 214 of the actuating lever 202. The stabilizer element 200 is positioned by placing the rear portion 220 of the stabilizer element 200 against the top surface 208 of the actuating lever 202 and placing the tab 216 on the front lip 214 of the actuating lever 202. The portion 204 is then pressed down to allow the pin 34c to be inserted into the openings in the legs 210. After the pin 34c is inserted into the legs 210, the portion 204 is then released to abut against the outer surface of the pin 34c.

Figure 31:
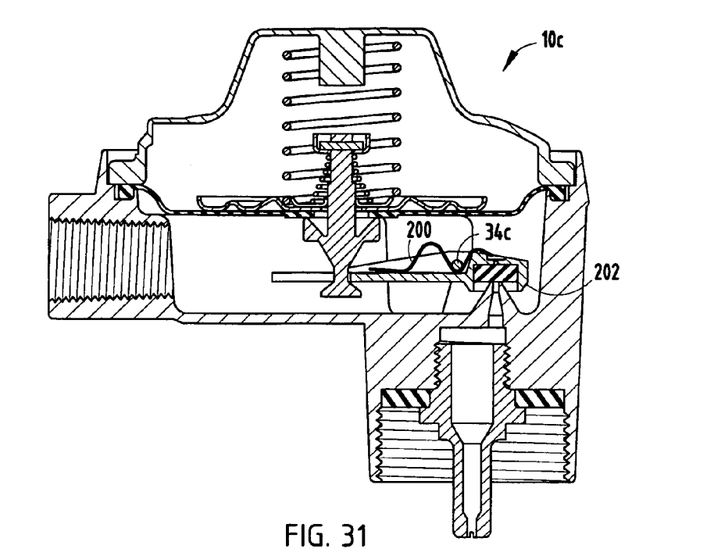
FIG. 31 is a cross-sectional perspective view of a pressure regulator in accordance with a fourth embodiment of the present invention.
Figures 32, 33, 34:
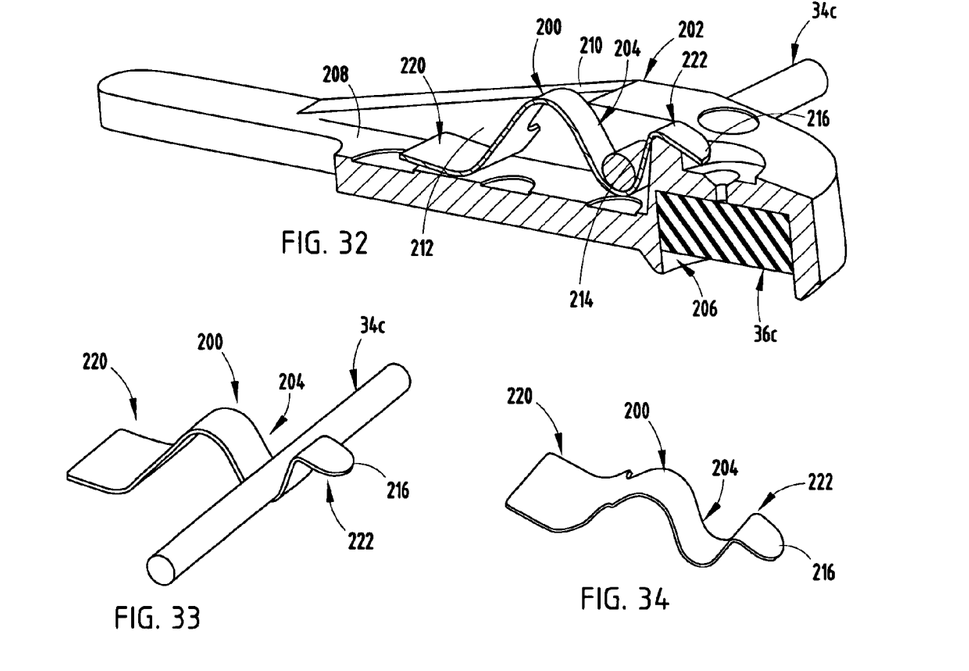
FIG. 32 is a cross-sectional perspective view of the actuating lever in accordance with the present invention, along with a pin and a sealing disc.
FIG. 33 is a perspective view of a stabilizer element and pivot pin in accordance with the present invention.
FIG. 34 is a perspective view of a stabilizer element in accordance with the present invention.

Operationally, the resiliently flexible portion 204 is sized and shaped to frictionally engage the pin 34a as illustrated in FIGS. 31-33. Specifically, the portion 204 is spring-biased against the outer surface of the pin 34c to produce a desired friction force therebetween upon movement of the actuating lever 202. The force may readily be adjusted by changing the surface contact area or the force of the portion 204 against the pin 34c, and also by changing dimensions or material selection for the sheet stock from which they are made, to make them more or less stiff. As will be recognized, the rounded lower extremity of the portion 204 provides a smooth moving contact between the portion 204 and the adjacent pin 34c against which the portion 204 frictionally bears during regulator operation.

As will be understood from consideration of the foregoing disclosure, the present invention provides a unique new type and form of stabilizer element 200 for fluid regulators 10c, particularly gas regulators, which is economical and easy to manufacture while at the same time being simple and fast to install during assembly. The new stabilizer element 200 permits easy adjustment to vary the amount of frictional force which it provides with respect to the pin 34c, by adjusting the surface contact area, the force of the portion 204 against the pin 34c and/or using different types of materials which have different physical properties, and/or using different cross sections or other dimensions which correspondingly change the forces produced. The sliding engagement against the outer surface of the pin 34c (which is contemplated as being smooth and flat or otherwise-shaped to accommodate the portion 204 during regulator operation) is continuous, steady and smooth, being constantly applied at any position of actuating lever movement and thereby serving to smooth out (damp) undesired regulator component movements that would otherwise be applied to the throttle-valve which controls the inlet flow of fluid into the regulator. A significant advantage of the embodiment shown is that it is so readily mounted in place during assembly, requiring no attachment to the regulator body or any other component, apart from the positioning described above. It is further contemplated that the stabilizer element 200 could be integral with the actuating lever.

The pressure regulator of the present invention provides a simplified and very compact design that can be incorporated into various regulator designs with slight modifications and should not be considered only unique to the disclosed design. It should be noted that in the event there is no downstream demand, gas pressure increases inside the chamber until the sealing disc forms a seal on the orifice, causing a zero flow or lockup condition. In this regard, the described invention also includes a safety feature commonly referred to as pressure control. As described previously, the mechanism of this device operates to control output flow pressure to meet downstream demand. When demand increases, outlet pressure decreases and this results in downward movement of the diaphragm and its related parts, including the stem-like actuator, causing the sealing disc to move incrementally away from the orifice and thereby allowing more flow through the device to supply the new demand at the same regulated pressure. This continues until the demand is satisfied and an equilibrium state is reached. Conversely, the same events occur in reverse for conditions of decreasing demand. Changes in inlet pressure and/or demand will cause the device to compensate by opening or closing the regulating assembly in response to and in accordance with the new conditions, to again reach an equilibrium state.

The described invention provides consistent repeatable performance over a wide range of inlet pressures and flow rates while also enabling significant reduction in orifice diameter and in diaphragm and overall regulator size. Furthermore, it accomplishes this by use of a simplified mechanism that is less expensive to manufacture and assemble, while at the same time providing better operating results due to the novel design, which substantially reduces function and regulating inaccuracies due to mechanical tolerance variations and lost motion inherent in less directly acting mechanisms which characterize the prior art.

The foregoing detailed description is considered that of a preferred embodiment only, and the particular shape and nature of at least some of the components in this embodiment are at least partially based on manufacturing advantages and considerations as well as on those pertaining to assembly and operation. Modifications of this embodiment may well occur to those skilled in the art and to those who make or use the invention after learning the nature of this preferred embodiment, and the invention lends itself advantageously to such modification and alternative embodiments. Therefore, it is to be understood that the embodiment shown in the drawings and described above is provided principally for illustrative purposes and should not be used to limit the scope of the invention.

I claim:

1. A pressure regulator comprising:
a housing having an inlet port and an outlet port;
a pivoting lever for selectively covering a section of a passage between the inlet port and the outlet port;
a diaphragm interconnected to the pivoting lever to rotate the lever in reaction to pressure levels in the housing; and
a closure member abutting the pivoting lever and covering the section of the passage to prevent fluid flow through the passage, the closure member not being directly attached to the pivoting lever.

2. The pressure regulator of claim 1, wherein:
a pivot pin pivotally connects the pivoting lever to the housing; and
the closure member is located between the pivot pin and the pivoting lever.

3. The pressure regulator of claim 2, wherein:
the closure member is compressed between the pivot pin and the pivoting lever.

4. The pressure regulator of claim 1, wherein:
the pivoting lever includes a slot defined by a top surface, a side wall and a lower lip; and
the closure member is at least partially located within the slot.

5. The pressure regulator of claim 1, wherein:
the housing has an internal chamber, with the inlet port fluidly connected to the internal chamber and the outlet port fluidly connected to the internal chamber;

the diaphragm divides the internal chamber into a lower chamber and an upper chamber; and the pivoting lever is located in the internal chamber and pivotally connected to the housing, the pivoting lever having a first position wherein the closure member covers a section of the internal chamber, thereby stopping fluid flow between the inlet port and the outlet port, the pivoting lever having a second position wherein the closure member does not cover the section of the internal chamber and allows fluid flow between the inlet port and the outlet port;

and further including a stem connected to the pivoting lever and the diaphragm, the stem pivoting the pivoting lever towards the first position to close the section of the internal chamber when pressure within lower chamber rises above a predetermined level.

6. The pressure regulator of claim 1, further including:
a rotatable adjustment cap connected to the housing;
a biasing element applying a force to the diaphragm to bias the pivoting lever to a position wherein the closure member does not cover the section of the passage; and
an adjustment member interconnecting the rotatable adjustment cap to the biasing element;
wherein rotation of the rotatable adjustment cap alternatively compresses the biasing element to increase the force applied to the diaphragm and decompresses the biasing element to decrease the force applied to the diaphragm; and
wherein the adjustment member translates rotational movement of the adjustment cap into compression or decompression of the biasing element without applying a rotational force to the biasing element.

7. The pressure regulator of claim 6, wherein:
the rotatable adjustment cap is not screwed onto the housing.

8. The pressure regulator of claim 6, wherein:
the adjustment member moves in the housing in a direction parallel to an axis of rotation of the rotatable adjustment cap.

9. The pressure regulator of claim 8, wherein:
the adjustment member includes a threaded outer surface; and
the rotatable adjustment cap includes at least one projection configured to be inserted into a thread of the threaded outer surface of the adjustment member to move the adjustment member within the housing.

10. The pressure regulator of claim 8, wherein:
the adjustment member includes at least one rib;
the internal chamber includes at least one vertical slot; and
the at least one rib slides in the at least one vertical slot to move the adjustment member.

11. The pressure regulator of claim 6, further including:
a stem connected to the pivoting lever and the diaphragm, the stem moving the pivoting lever towards a first position to close the section of the passage when pressure within a portion of the housing rises above a predetermined level.

12. The pressure regulator of claim 11, further including:
a shut-off clip connected to the adjustment member and the stem;
wherein the rotatable adjustment cap is configured to move the adjustment member, the shut-off clip, the stem and the pivoting lever to the first position to positively shut-off flow through the housing.

13. The pressure regulator of claim 1, further including:
a rotatable adjustment cap connected to the housing; and
a biasing element applying a force to the diaphragm to bias the pivoting lever to a position wherein the closure member does not cover the section of the passage;
wherein the housing further has at least one slot;
wherein rotation of the rotatable adjustment cap alternatively compresses the biasing element to increase the force applied to the diaphragm and decompresses the biasing element to decrease the force applied to the diaphragm; and
wherein the rotatable adjustment cap includes a tab configured to be selectively inserted into the at least one slot to prevent rotation of the adjustment cap.

14. The pressure regulator of claim 13, wherein:
the at least one slot comprises at least two slots;
the at least two slots include a first slot and a second slot;
when the at least one tab is in the first slot, the closure member prevents fluid flow through the passage; and
when the at least one tab is in the second slot, the closure member does not prevent fluid flow through the passage.

15. The pressure regulator of claim 1, further including:
a rotatable adjustment cap connected to the housing;
a biasing element applying a force to the diaphragm to bias the pivoting lever to a position wherein the closure member does not cover the section of the passage; and
an adjustment member interconnecting the rotatable adjustment cap to the biasing element, the adjustment member including a threaded outer surface;
wherein rotation of the rotatable adjustment cap alternatively compresses the biasing element to increase the force applied to the diaphragm and decompresses the biasing element to decrease the force applied to the diaphragm; and
wherein the rotatable adjustment cap includes at least one projection configured to be inserted into a thread of the threaded outer surface of the adjustment member to move the adjustment member within the housing.

16. The pressure regulator of claim 1, further including:
a rotatable adjustment cap connected to the housing;
a biasing element applying a force to the diaphragm to bias the pivoting lever to a position wherein the closure member does not cover the section of the passage;
an adjustment member interconnecting the rotatable adjustment cap to the biasing element;
a stem connected to the pivoting lever and the diaphragm, the stem moving the pivoting lever towards a first position to close the section of the passage when pressure within a portion of the housing rises above a predetermined level; and
a shut-off clip connected to the adjustment member and the stem;
wherein rotation of the rotatable adjustment cap alternatively compresses the biasing element to increase the force applied to the diaphragm and decompresses the biasing element to decrease the force applied to the diaphragm; and
wherein the rotatable adjustment cap is configured to move the adjustment member, the shut-off clip, the stem and the pivoting lever to the first position to positively shut-off flow through the housing.

17. A method of assembling a pressure regulator comprising:
providing a housing having an inlet port and an outlet port;
positioning a pivoting lever in the housing to selectively cover a section of a passage between the inlet port and the outlet port;

interconnecting a diaphragm to the pivoting lever to rotate the lever in response to pressure levels in the housing; and abutting a closure member against the pivoting lever to move with the pivoting lever, the closure member being configured to cover the section of the passage to prevent fluid flow through the passage, the closure member not being directly attached to the pivoting lever.

18. The method of claim 17, further including:
pivotally connecting the pivoting lever to the housing with a pivot pin;
locating the closure member between the pivot pin and the pivoting lever.

19. The method of claim 18, further including:
compressing the closure member between the pivot pin and the pivoting lever.

20. The method of claim 17, further including:
connecting a rotatable adjustment cap to the housing;
applying applying a force to the diaphragm with a biasing element to bias the pivoting lever to a position wherein the closure member does not cover the section of the passage; and
interconnecting the rotatable adjustment cap to the biasing element with an adjustment member, the adjustment member including a threaded outer surface;
wherein rotation of the rotatable adjustment cap alternatively compresses the biasing element to increase the force applied to the diaphragm and decompresses the biasing element to decrease the force applied to the diaphragm; and
wherein the rotatable adjustment cap includes at least one projection configured to be inserted into a thread of the threaded outer surface of the adjustment member to move the adjustment member within the housing.

21. The method of claim 17, further including:
connecting a rotatable adjustment cap to the housing;
applying applying a force to the diaphragm with a biasing element to bias the pivoting lever to a position wherein the closure member does not cover the section of the passage;
interconnecting the rotatable adjustment cap to the biasing element with an adjustment member;
connecting a stem to the pivoting lever and the diaphragm, the stem moving the pivoting lever towards a first position to close the section of the passage when pressure within a portion of the housing rises above a predetermined level; and
connecting a shut-off clip to the adjustment member and the stem;
wherein rotation of the rotatable adjustment cap alternatively compresses the biasing element to increase the force applied to the diaphragm and decompresses the biasing element to decrease the force applied to the diaphragm; and
wherein the rotatable adjustment cap is configured to move the adjustment member, the shut-off clip, the stem and the pivoting lever to the first position to positively shut-off flow through the housing.

22. A pressure regulator comprising:
a housing having an inlet port and an outlet port;
a pivoting lever for selectively covering a section of a passage between the inlet port and the outlet port;
a diaphragm interconnected to the pivoting lever to rotate the lever in reaction to pressure levels in the housing;
a stabilizer element movable with the pivoting lever, the stablizer having at least two oppositely curved sections; and
a pivot pin in the housing, the pivoting lever pivoting on the pivot pin;
the stabilizer element frictionally abutting a portion of the pivot pin as the pivoting lever rotates to thereby stabilize movement of the pivoting lever.

23. The pressure regulator of claim 22, wherein:
the stabilizer element includes a semi-circular portion;
the portion of the pivot pin comprises a section of an outer cylindrical surface of the pivot pin; and
the semi-circular portion of the stabilizer element abuts against the section to frictionally engage the pivot pin.

24. A pressure regulator comprising:
a housing having an internal chamber, an inlet port fluidly connected to the internal chamber and an outlet port fluidly connected to the internal chamber;
a diaphragm dividing the internal chamber into a lower chamber and an upper chamber;
a member located in the internal chamber and interconnected to the diaphragm, the member having a first position stopping fluid flow between the inlet port and the outlet port, the member having a second position allowing fluid flow between the inlet port and the outlet port;
a rotatable adjustment cap connected to the housing;
a biasing element applying a force to the diaphragm to bias the member towards the second position; and
an adjustment member interconnecting the rotatable adjustment cap to the biasing element;
wherein rotation of the rotatable adjustment cap alternatively compresses the biasing element to increase the force applied to the diaphragm and decompresses the biasing element to decrease the force applied to the diaphragm;
wherein the adjustment member translates rotational movement of the adjustment cap into compression or decompression of the biasing element without applying a rotational force to the biasing element; and
wherein the adjustment member includes a threaded outer surface and the rotatable adjustment cap includes at least one projection configured to be inserted into a thread of the threaded outer surface of the adjustment member to move the adjustment member within the housing.

25. The pressure regulator of claim 24, wherein:
the member comprises a pivoting lever configured to pivot in the housing relative to the housing.

26. The pressure regulator of claim 24, wherein:
the rotatable adjustment cap is not screwed onto the housing.

27. The pressure regulator of claim 24, wherein:
the adjustment member moves in the housing in a direction parallel to an axis of rotation of the rotatable adjustment cap.

28. The pressure regulator of claim 27, wherein:
the adjustment member includes at least one rib;
the internal chamber includes at least one vertical slot; and
the at least one rib slides in the at least one vertical slot to move the adjustment member.

29. The pressure regulator of claim 24, further including:
a stem connected to the member and the diaphragm, the stem moving the member towards the first position to close the section of the internal chamber when pressure within lower chamber rises above a predetermined level; and a shut-off clip connected to the adjustment member and the stem;

wherein the rotatable adjustment cap is configured to move the adjustment member, the shut-off clip, the stem and the member to the first position to positively shut-off flow through the housing.

30. A pressure regulator comprising:

a housing having an internal chamber, an inlet port fluidly connected to the internal chamber and an outlet port fluidly connected to the internal chamber, the housing further having at least one slot;

a diaphragm dividing the internal chamber into a lower chamber and an upper chamber;

a member located in the internal chamber and interconnected to the diaphragm, the member having a first position stopping fluid flow between the inlet port and the outlet port, the member having a second position allowing fluid flow between the inlet port and the outlet port;

a rotatable adjustment cap connected to the housing;

a biasing element engaging the diaphragm to bias the member towards the second position;

wherein rotation of the rotatable adjustment cap alternatively compresses the biasing element to increase the force applied to the diaphragm and decompresses the biasing element to decrease the force applied to the diaphragm; and the rotatable adjustment cap including a tab configured to be selectively inserted into the at least one slot to prevent rotation of the adjustment cap;

wherein the tab is pushed inward in a direction perpendicular to an axis of rotation of the rotatable adjustment cap and towards the axis of rotation of the rotatable adjustment cap to remove the tab from the at least one slot.

31. The pressure regulator of claim 30, wherein:

the member comprises a pivoting lever configured to pivot in the housing relative to the housing.

32. The pressure regulator of claim 30, wherein:

the at least one slot comprises at least two slots;

the at least two slots include a first slot and a second slot;

when the at least one tab is in the first slot, the member is in the first position; and when the at least one tab is in the second slot, the member is in the second position.

* * * * *